US011619397B2

(12) United States Patent
Pille

(10) Patent No.: US 11,619,397 B2
(45) Date of Patent: Apr. 4, 2023

(54) SNAP SPRING CLIP FOR BURNER UNIT MOUNTING

(71) Applicant: WHIRLPOOL CORPORATION, Benton Harbor, MI (US)

(72) Inventor: Alexander S. Pille, St. Joseph, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 616 days.

(21) Appl. No.: 16/600,631

(22) Filed: Oct. 14, 2019

(65) Prior Publication Data

US 2020/0041137 A1 Feb. 6, 2020

Related U.S. Application Data

(63) Continuation of application No. 15/806,788, filed on Nov. 8, 2017, now Pat. No. 10,458,659, which is a continuation of application No. 14/694,010, filed on Apr. 23, 2015, now Pat. No. 9,851,108.

(51) Int. Cl.
*F24C 15/10* (2006.01)
*F16B 2/24* (2006.01)
*H05B 3/74* (2006.01)

(52) U.S. Cl.
CPC ............ *F24C 15/108* (2013.01); *F16B 2/241* (2013.01); *F24C 15/102* (2013.01); *H05B 3/748* (2013.01); *H05B 2206/022* (2013.01)

(58) Field of Classification Search
CPC ...... F24C 15/108; F24C 15/102; F16B 2/241; H05B 3/748; H05B 2206/022
See application file for complete search history.

(56) References Cited

U.S. PATENT DOCUMENTS

| | | | |
|---|---|---|---|
| 3,674,983 A | 7/1972 | Hurko et al. | |
| 3,789,189 A | 1/1974 | Fischer et al. | |
| 3,819,903 A | 6/1974 | Frick | |
| 4,264,805 A | 4/1981 | Traut | |
| 4,788,414 A | 11/1988 | Schreder | |
| 5,410,128 A | 4/1995 | Vermillion et al. | |
| 5,549,098 A | 8/1996 | Bales et al. | |
| 5,859,410 A * | 1/1999 | White | F24C 15/102 219/452.11 |
| 5,954,981 A | 9/1999 | Deo et al. | |
| 5,990,457 A | 11/1999 | Steiner et al. | |
| 6,111,229 A | 8/2000 | Schultheis | |
| 6,207,934 B1 | 3/2001 | Steiner et al. | |
| 6,252,205 B1 | 6/2001 | Schultheis et al. | |
| 6,431,259 B2 | 8/2002 | Hellbrück et al. | |
| 7,009,151 B2 | 3/2006 | Lee | |
| 7,057,139 B2 | 6/2006 | McWilliams | |

(Continued)

*Primary Examiner* — Shawntina T Fuqua
(74) *Attorney, Agent, or Firm* — Price Heneveld LLP

(57) ABSTRACT

A spring clip for attaching a radiant burner unit to a cooktop includes a retention tab having a portion extending in a first direction and a retention arm defining a lever portion projecting away from the retention tab to an end displaced from the tab in a second direction generally normal to the first direction. The retention arm further defines a resiliently deformable section facilitating movement of the lever toward and away from the retention tab. The spring clip further includes a snap tab positioned opposite the retention arm from the retention tab and resiliently deflectable toward and away from the retention tab.

19 Claims, 6 Drawing Sheets

(56) References Cited

U.S. PATENT DOCUMENTS

| | | | |
|---|---|---|---|
| 8,526,800 B2* | 9/2013 | Fritschie | F24C 15/102 29/430 |
| 9,851,108 B2* | 12/2017 | Pille | F24C 15/108 |
| 10,349,469 B2* | 7/2019 | Khokle | H05B 6/04 |
| 10,458,659 B2* | 10/2019 | Pille | F16B 2/241 |
| 2004/0149724 A1 | 8/2004 | Taplan et al. | |
| 2018/0066852 A1 | 3/2018 | Pille | |
| 2022/0364733 A1* | 11/2022 | Hill | F24C 15/108 |

* cited by examiner

SNAP SPRING CLIP FOR BURNER UNIT MOUNTING

CROSS-REFERENCE TO RELATED APPLICATION

This application is a continuation of and claims priority to U.S. patent application Ser. No. 15/806,788, filed on Nov. 8, 2017, now U.S. Pat. No. 10,458,659, which is a continuation of U.S. patent application Ser. No. 14/694,010, filed on Apr. 23, 2015, now U.S. Pat. No. 9,851,108, both of which are entitled "SNAP SPRING CLIP FOR BURNER UNIT MOUNTING." The disclosures of each are hereby incorporated herein by reference in its entirety.

BACKGROUND

The present device generally relates to a spring clip for coupling an electric burner unit with a support structure of a glass-ceramic cooktop. In particular, the spring clip facilitates snap-in installation of the electric burner with the support structure in a vertical direction.

Various electric cooking hobs, including those used in ranges and as stand-alone cooktops use an arrangement in which a glass-ceramic (sometimes simply referred to as "glass") substrate is used as a continuous upper cooking surface. A support structure, often of metal, underlies the glass-ceramic substrate, providing structural support for the substrate. A plurality of burner units are mounted to the support structure beneath desired cooking locations distributed along the substrate. For purposes of heat transfer to the cooking surface of the substrate, it may be desired for a housing of the burner unit to be in generally continuous contact with the underside of the substrate, making a reliable fit of the coupling between the burner unit and the support structure desirable. Springs have been used for such coupling, but may lack vertical support in certain structures where the coupling points between the burner unit and support structure are near horizontal alignment. Further, springs may be difficult to assemble, requiring extension and assembly of hooked ends thereof with the appropriate structures. Accordingly, further advances may be desired.

SUMMARY

In at least one aspect, a spring clip for attaching a radiant burner unit to a cooktop includes a retention tab having a portion extending in a first direction and a retention arm defining a lever portion projecting away from the retention tab to an end displaced from the tab in a second direction generally normal to the first direction. The retention arm further defines a resiliently deformable section facilitating movement of the lever toward and away from the retention tab. The spring clip further includes a snap tab positioned opposite the retention arm from the retention tab and resiliently deflectable toward and away from the retention tab.

In at least another aspect, a cooktop includes a support structure defining a burner unit aperture therein and a retention aperture adjacent the burner unit aperture and a burner unit comprising a heating element retained within a housing having a vertical side wall and a lower surface with a hole therein adjacent the side wall. A spring clip retains the burner unit within the burner unit aperture and includes a retention tab engaged with the hole in the burner unit and includes a portion extending in a first direction within the housing and a retention arm defining a lever portion projecting away from the retention tab to an end contacting the side wall of the housing. The retention arm further defines a resiliently deformable section biasing the lever against the side wall. The spring clip further includes a snap tab spaced apart from the housing and engaged with the retention aperture.

In at least another aspect, a method for assembling a burner unit with a cooktop includes assembling a first spring clip with a housing of the burner unit, which includes aligning a retention tab of the first spring clip with a first hole in a lower surface of the housing with a retention arm of the first spring clip biased against a side wall of the housing. The method further includes engaging a spring tab of the first spring clip with a first receiving aperture disposed in a support structure of the cooktop by vertical movement of the housing toward the support structure.

These and other features, advantages, and objects of the present device will be further understood and appreciated by those skilled in the art upon studying the following specification, claims, and appended drawings.

DETAILED DESCRIPTION OF EMBODIMENTS

Figure 1:
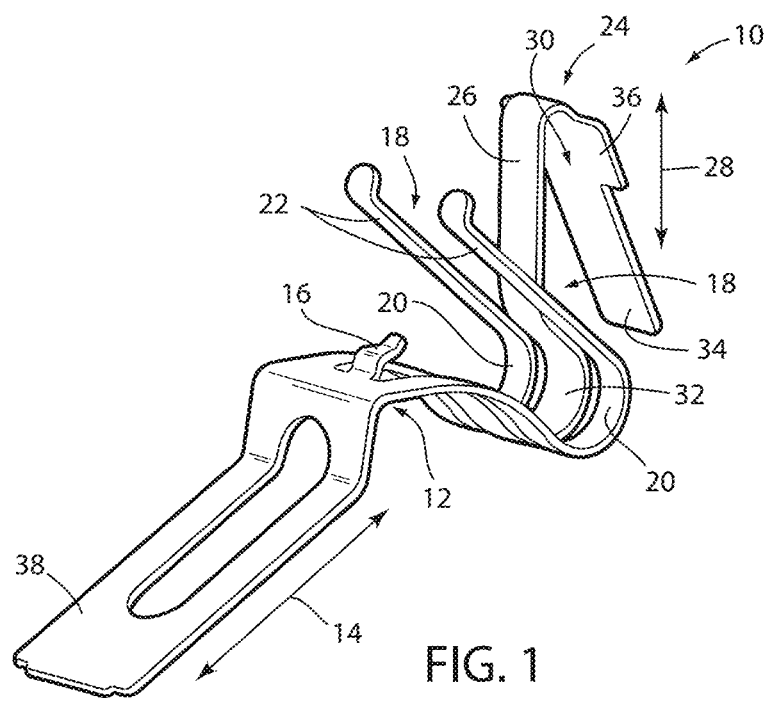
FIG. 1 is a front perspective view of a spring clip.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiment illustrated in FIG. 1, reference numeral 10 generally designates a spring clip for attaching a radiant burner unit to a cooktop. Spring clip 10 includes a body 12 extending in a lateral direction 14 and a retention tab 16 projecting from the body 12 and extending in the lateral direction 14 adjacent the body 12. Spring clip 10 further includes a retention arm 18 projecting from body 12 and defining a first spring loop 20 and lever 22. The spring loop 20 biases the lever 22 generally toward retention tab 16. A snap tab 24 having a support arm 26 projects from body 12 in a vertical direction 28 and a tab 30 resiliently flexible toward and away from the support arm 26.

Figure 2:
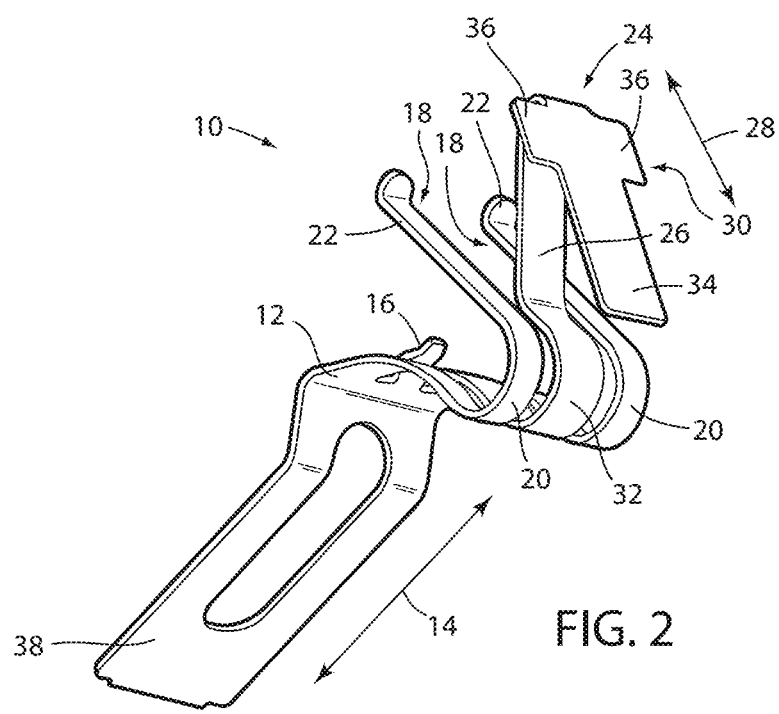
FIG. 2 is a rear perspective view of the spring clip of FIG. 1.

As further shown in FIGS. 1 and 2, support arm 26 is coupled with body 12 by a second spring loop 32. The second spring loop 32 is resiliently deformable such as through expansion or contraction thereof to allow movement of support arm 26 with respect to body 12. In particular, such movement may include movement of support arm 26 in vertical direction 28 such that tab 30 of snap tab 24 can be moved relative to body 12. Such movement can allow spring clip 10 to accommodate variation in the size and/or geometry of related structures of the radiant burner and/or cooktop unit, examples of which are discussed further below, with which spring clip 10 is used.

Tab 30 of snap tab 24 can include a release arm 34 extending in vertical direction 14 such that release arm 34 extends vertically back toward body 12 and is generally spaced apart from support arm 26. Side arms 36 extend from tab 30 on opposite sides thereof and, as explained further below, can facilitate attachment of spring clip with a related structure. Release arm 34 can extend vertically downward beyond side arms 36 to provide a point of contact for a user to deform snap tab 24 such that side arms 36 move toward support arm 26, which can be done during removal of spring clip 10 from a related structure. In this manner, snap tab 24 allows spring clip 10 to be assembled with a related structure, described further below, by movement of the upper portion of support arm and tab 30 inward with respect to such associated structure so as to cause inward bending of tab 30 relative to support arm 26 until appropriate assembly is achieved, at which point tab 30 returns outwardly toward the rest position depicted in FIG. 2 with side arms 36 retaining snap tab 24 in the associated structure and release arm 34 projecting outwardly therefrom to provide for an accessible structure to facilitate release of snap tab 24 from such structure.

As further shown in FIGS. 1 and 2, spring clip 10 may include a pair of retention arms 18 disposed on opposite sides of snap tab 24. As discussed above, each retention arm 18 can include a spring loop 20 providing an expandable and/or deformable area of retention arm 18 for resilient deformation of retention arms 18 and corresponding movement of the respective levers 22 thereof outwardly away from retention tab 16. Such movement is against a biasing force of spring loops 20 that urges levers 22 back toward retention tab 16. The arrangement shown in FIGS. 1 and 2 in which two such retention arms are shown on opposite sides of snap tab 24 and can provide for a generally even biasing force by levers 22 with respect to retention tab 16, while allowing snap tab 24 to be centrally disposed with respect to body 12.

In the example shown in the drawings, spring clip 10, including body 12, retention tab 16, retention arms 18, and snap tab 24 can be of a single, unitary piece of material. In one example, such material can be a metal including steel such as stainless steel, spring steel or the like. In such an example, spring clip 10 can be stamped out of a larger blank piece of metal in a substantially flat arrangement and then bent into the shape depicted in the Figures. In other examples, variations of spring clip 10 may be of a molded material such as plastic or the like upon which the shape depicted in FIGS. 1 and 2 may be applied thereto by molding or the like.

Figure 3:
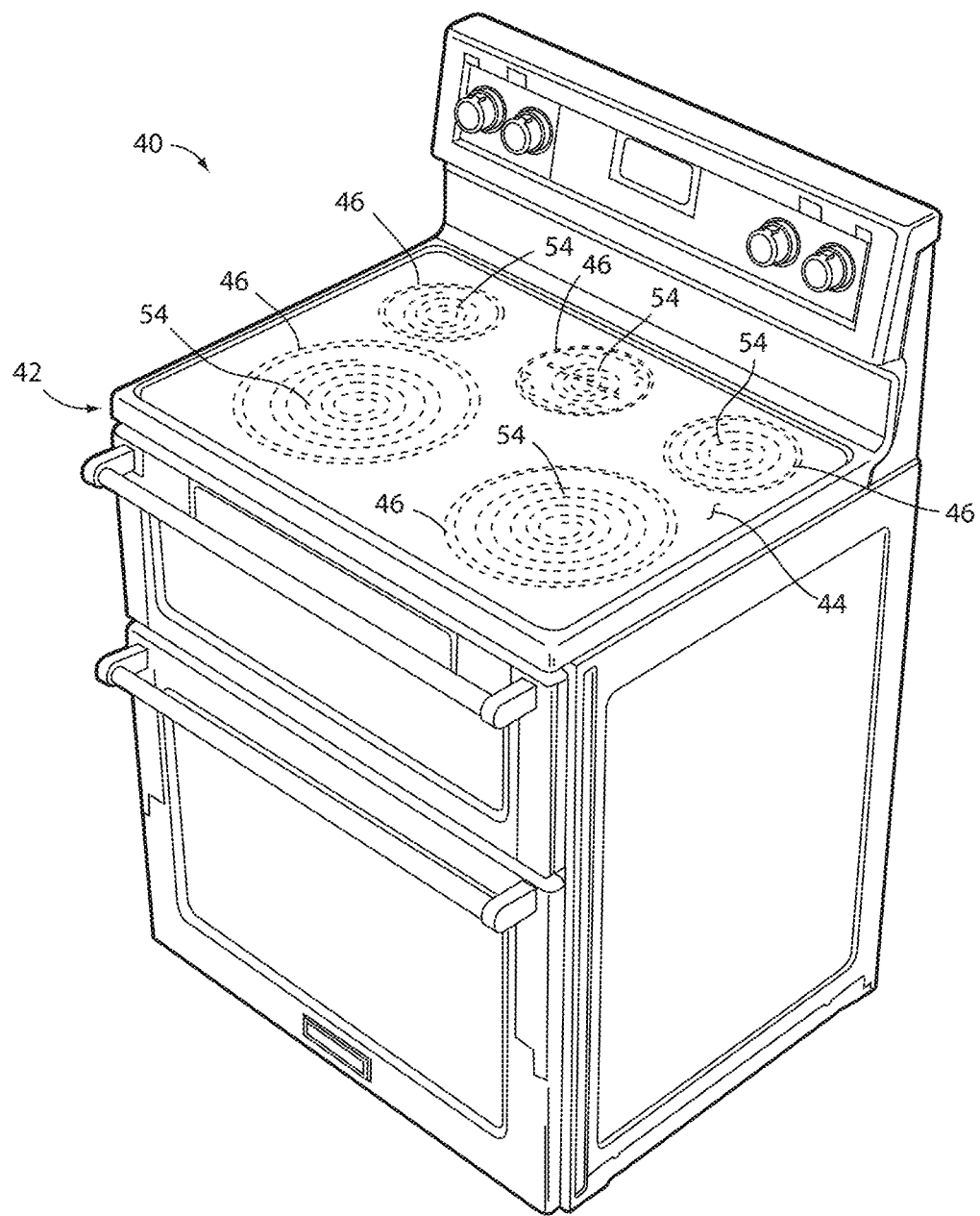
FIG. 3 is a front perspective view of a range including a glass-ceramic cooktop surface.
Figure 4:
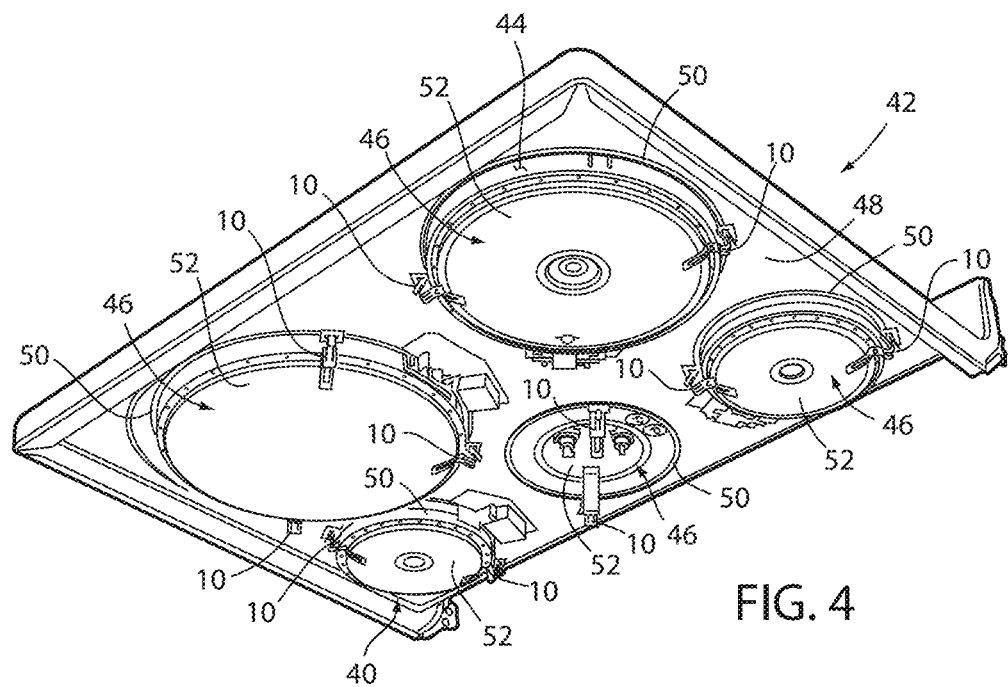
FIG. 4 is a bottom perspective view of the cooktop of the range of FIG. 3 having a plurality of burner units coupled with a support structure of the cooktop surface using a corresponding plurality of spring clips.
Figure 5:
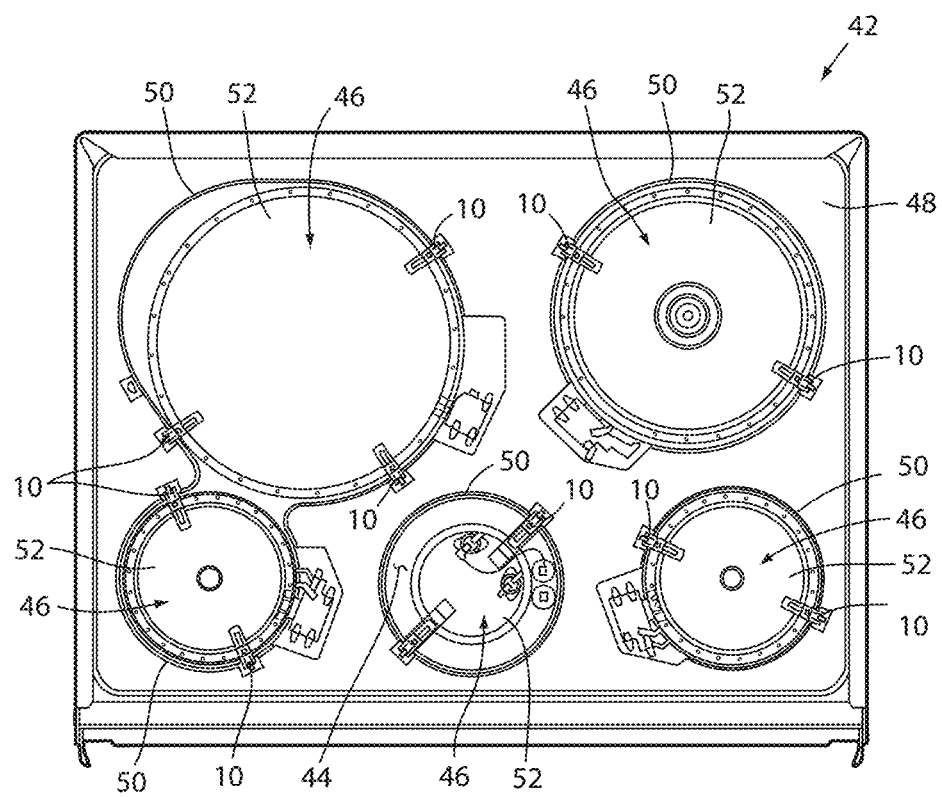
FIG. 5 is a bottom view of the cooktop of FIG. 4.

As shown in FIGS. 3-5, a plurality of spring clips 10 can be used in connection with an oven 40 or another similar appliance including a cooking hob or cooktop 42 having a glass cooking surface with a plurality of individual burner units 46 positioned at strategic locations beneath glass 44. As shown in FIGS. 4 and 5, a plurality (e.g. 2 or 3) spring clips 10 can be used with respective burner units 46 to retain the burner units 46 against glass 44 on an inner side of cooktop 42. In general such types of cooktops 42 are known and may include various compositions for what is referred to simply as "glass" 44 herein, but which may include glass with various additives and/or mixtures of glass with other materials such as ceramic or the like. An example of such a material is available under the name Ceran™ from Schott North America, Inc. of Elmsford, N.Y. As shown in FIGS. 4 and 5, the glass 44 of cooktop 42 is supported on a support structure 48 that generally spans the length and width of glass 44 and includes a plurality of apertures 50 therein in the desired locations of burner units 46. As shown, burner units 46, each of which includes a housing 52 and a radiant heating element 54 (shown in FIG. 3 and which may provide heat via resistance when an electric current is applied thereto) retained therein are positionable against the underside 56 of glass 44 such that the heat generated from heating elements 54 is efficiently directed upwardly to and through glass 44. Accordingly, spring clips 10 are utilized in connection with the individual burner units 46 to retain burner units 46 within the respective designated apertures 50 in contact glass 44 by engaging between the respective housing 52 and adjacent portions of the support structure 48.

Figure 6:
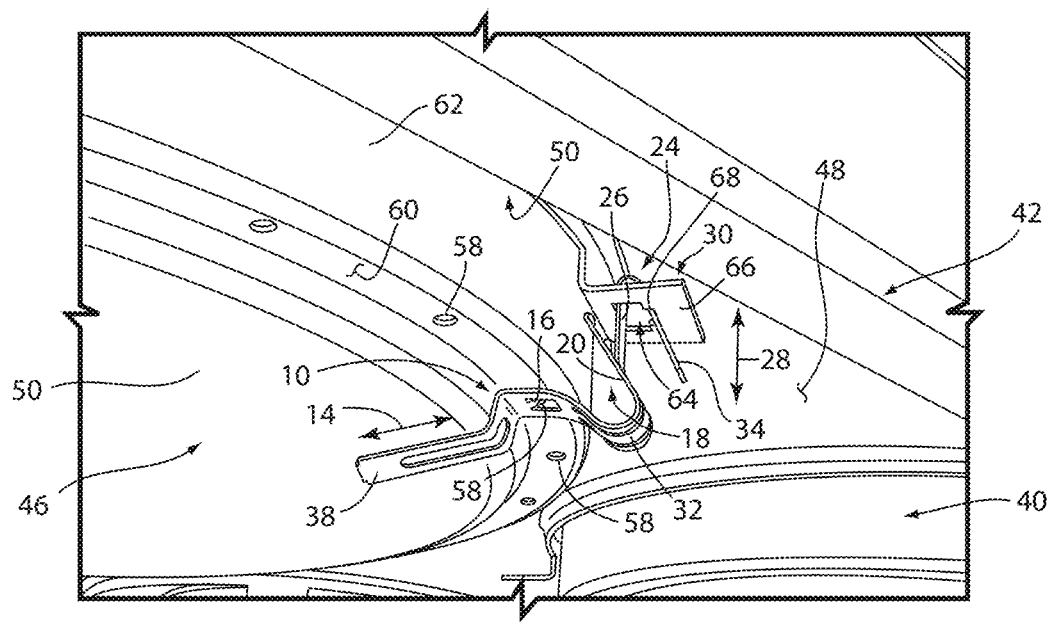
FIG. 6 is a bottom perspective detail view of a portion of the cooktop of FIG. 4 showing the coupling of a spring clip between a burner unit and the support structure thereof.
Figure 7:
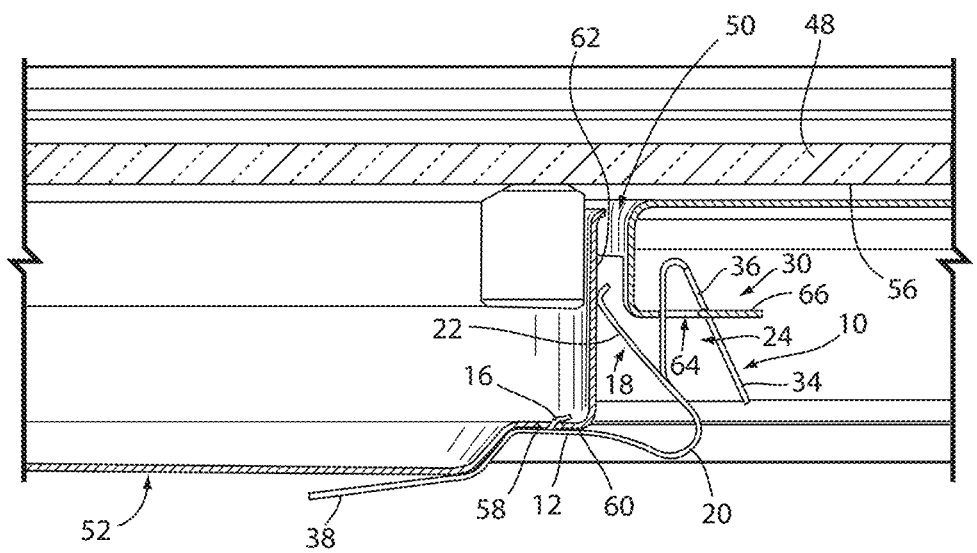
FIG. 7 is a cross-sectional detail view of a portion of the cooktop of FIG. 6 showing the coupling of the spring clip between the burner unit and the support structure thereof.

Turning now to FIGS. 6 and 7, the attachment of spring clip 10 between one of burner units 46 and support structure 48 of cooktop 42 is shown in greater detail. In particular, spring clip 10 engages with housing 52 of burner unit 46 by insertion of retention tab 16 into hole 58 disposed on a bottom wall 60 of housing 52. As further shown in FIGS. 6 and 7, retention arms 18 are configured so as to be biased against a side wall 62 of housing 52 when retention tab 16 assembled within hole 58. In this manner, the biasing of retention arms 18 toward retention tab 16 will cause levers 22 of retention arms 18 to be further biased against side wall 62 such that a generally constant force is applied thereon, which acts to urge body 12 of spring clip 10 outwardly in lateral direction 14 with respect to housing 52 such that retention tab 16, which extends in a direction generally toward retention arms 18, is retained on an interior side of bottom wall 60 by a portion of retention tabs 16 extending therein and toward side wall 62. As further shown, portions of body 12, including portions thereof adjacent to retention tab 16 and body extension portion 38, may be shaped so as to match a contour of bottom wall 60 of housing 52 so as to help maintain a general position of spring clip 10 with respect to housing 52 to help prevent spring clip 10 from becoming dislodged from housing 52, such as prior to assembly of spring clip 10 with support structure 48. Body extension 38 can also include a portion thereof that may be spaced apart from bottom wall 60 during and/or after assembly of spring clip 10 with housing 52 to provide a location for an assembler to manipulate spring clip 10 with respect to housing 52.

As further shown in FIGS. 6 and 7, spring clip 10 can engage with support structure 48 of cooktop 42 by engagement of snap tab 24 with a corresponding tab aperture 64 in support structure 48. As shown in FIGS. 6 and 7, the apertures 64 of support structure 48 can be disposed in a flange 66 that extends from support structure 48 adjacent burner aperture 50 and, further, outwardly with respect to burner aperture 50 to appropriately position tab aperture 64 with respect thereto. Tab aperture 64 can be configured so as to accommodate snap tab 24, including during assembly thereof, and to retain snap tab 24 with support structure 48 in a snap-fit arrangement.

In particular, tab aperture 64 can be shaped to generally accommodate both support arm 26 and tab 30 of snap tab 24 therein, including during assembly of snap tab 24 with aperture 64 by deformation of tab 30 inwardly with respect to support arm 26 such that side arms 36 can fit within aperture 64. This deformation can be such that an appropriate amount of force on spring clip 10 can achieve such deformation without requiring excessive force thereon. Further, aperture 64 can include a cutout 68 therein to accommodate release arm 34 therethrough after side arms 36 clear adjacent portions of aperture 64, thereby allowing tab 30 to return outwardly toward the rest position thereof (as illustrated in FIGS. 1 and 2) such that side arms 36 are positioned on an upper surface of flange 66 outside of apertures 64. In an example, apertures 64 may be particularly sized such that tab 30 remains somewhat deflected inwardly with respect to support arm 26 and with further respect to the rest position thereof, such that unintended movement or vibration of snap tab 24 within tab aperture 64 is minimized.

The illustrated assembly of snap tab 24 with tab aperture 64 may further include deflection of snap tab 24 in the vertical direction 28, such as by resilient deformation of support arm spring loop 32 such that snap tab 24 provides a vertical bias via the desire of snap tab 24 to return to the rest position (shown in FIGS. 1 and 2). Such vertical force of spring clip 10 is, accordingly, applied on housing 52, thereby urging housing 52 against the underside 56 of glass 44, which may minimize vibration of housing 52 against glass 48 and, further, provide an appropriate seal of housing 52 with glass 44.

Figure 8:
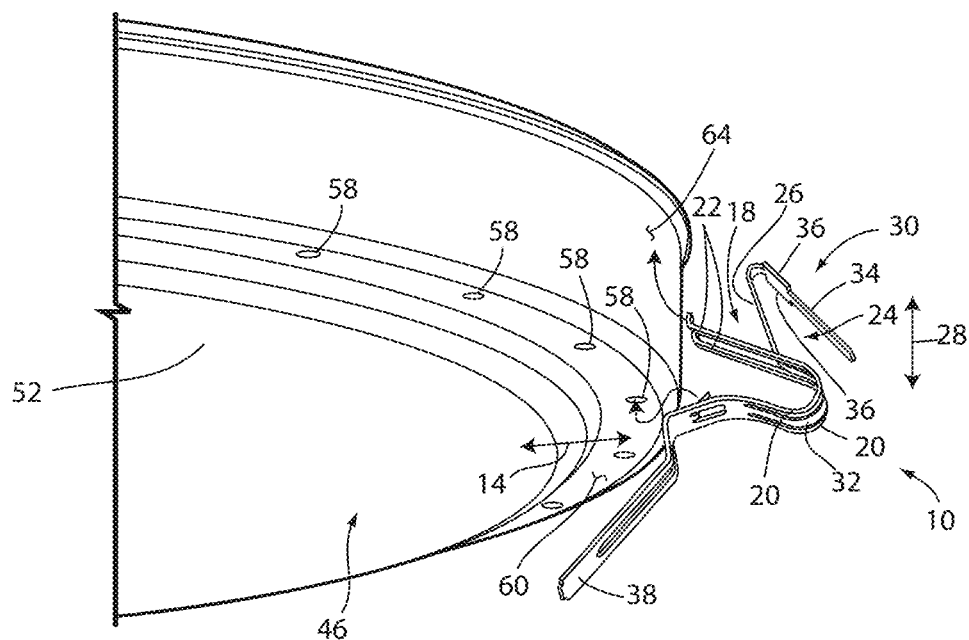
FIG. 8 is a detail view showing a state of the spring clip and the burner unit of FIG. 6 during a step of assembling the spring clip with the burner unit.
Figure 9:
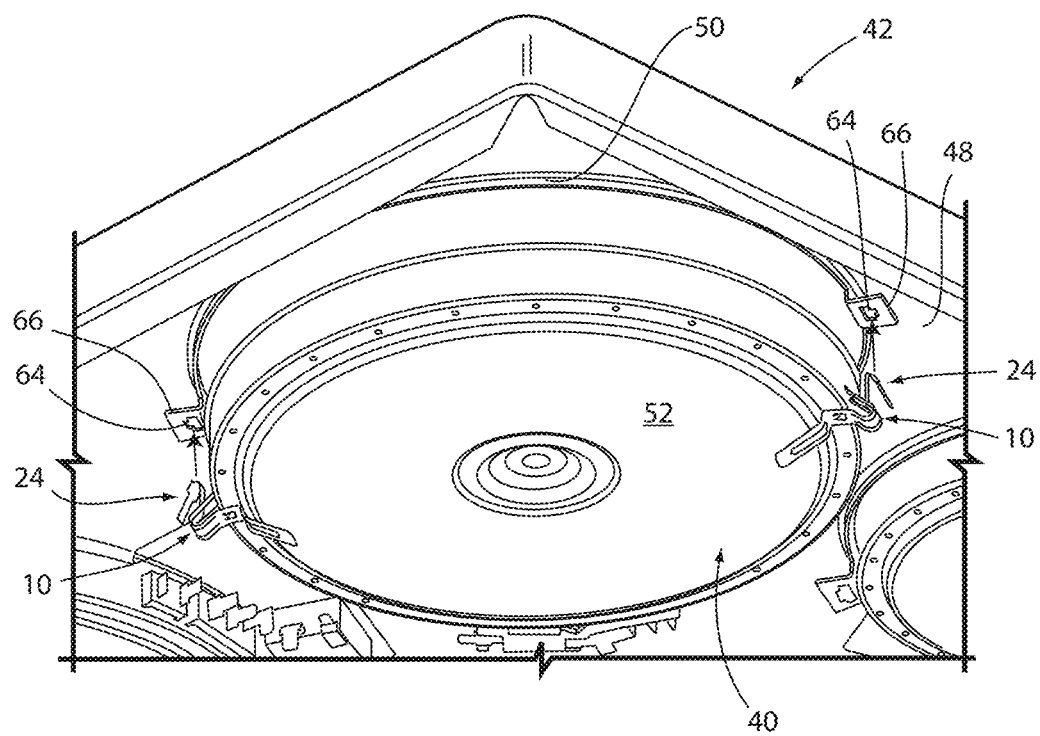
FIG. 9 is a detail view showing a state of the assembled spring clip and burner unit of FIG. 8 with the support structure of the cooktop during a step of assembly thereof.

Turning now to FIGS. 8 and 9, steps in a process of assembling spring clip 10 with housing 52, and with support structure 48, to retain a burner unit 46 with cooktop 42 are illustrated. In particular FIG. 8 shows assembly of spring clip 10 with housing 52 of burner unit 46. As illustrated, spring clip 10 may be rotated such that retention tab 16 generally extends in vertical direction 28 so as to fit into hole 58 in bottom wall 60 of housing 52. Such rotation moves lever portions 22 of retention arms 18 toward side wall 62 of housing 52. In this manner, inward movement of spring clip 10 with respect to housing 52 will bring levers 22 of retention arms 18 into contact with side wall 62, which may occur prior to alignment of retention tab 16 with hole 58. Accordingly, retention tab 16 may be aligned with hole 58 for assembly therewith by deflection of retention arms 18, including by expansion of retention spring loops 20 against the biasing force thereof.

When retention tab 16 is appropriately aligned with hole 58, body 12 of spring clip 10 may be moved in vertical direction 28 so as to extend retention tab 68 into hole 58. Such movement may also include rotation of spring clip 10 such that body 12 begins to align with bottom 60 of housing 52, thereby moving retention tab 16 to a position where a portion of tab 16 is disposed on an interior of housing 52 extends in the generally lateral direction 14 in an area adjacent hole 58. In this manner, retention tab 16 may maintain body 12 in general contact with bottom wall 60 of housing 52. As described above, when spring clip 10 is brought into such a position, retention arms 18 may remain biased against side wall 62 of housing 52, thereby providing a force against body 12 in lateral direction 14, such that retention tab 16 is urged in a direction toward side wall 62. This arrangement helps to retain retention tab 16 in an engaged position with respect to hole 58 (such as that shown in FIGS. 6 and 7). Such assembly of spring clip 10 with housing 52 may be repeated with additional spring clips 10, such that a desired number of spring clips 10 (e.g. two, as shown in FIG. 9) are assembled with housing 52. As shown in FIG. 8, housing 52 may include a plurality of holes 58, including more holes 58 than are needed to accommodate the desired number of spring clips 10. Such holes 58 may be spaced at regular intervals around a perimeter of bottom walls 60 to allow for various positioning of the desired spring clips 10 according to the particular geometry of support structure 48 and the related positioning of burner unit 46. In an example, this configuration of holes 58 can allow for use of similar burner units 46 in various positions with respect to cooktop 42 and with various other examples of similar cooktops 42.

As shown in FIG. 9, after assembly of the desired number of the spring clips 10 with housing 52, which may include two or more spring clips (e.g. three or four spring clips 10 depending on for example, the size of the burner unit 46), spring clips 10 and, accordingly, burner unit 46, are assembled with support structure 48 of cooktop 42. As shown in FIG. 9, this can include alignment of snap tabs 24 with tab apertures 64 of support structure 48. After such alignment, burner unit 48 may be moved toward glass 44 within burner aperture 50 to bring the upper portions of snap tabs 24 into contact with corresponding tab apertures 64. After such contact has been established, the individual spring clips 10 may be acted upon to cause the above-described inward deflection of tabs 32 with respect to the associated support arms 26, to allow for clearance of side arms 36 through tab aperture 64. In particular the force upon spring clip 10 can be applied along support arm spring loop 32 to cause deformation thereof that corresponds to movement of support arm and tab 30 in the vertical direction 28 (i.e. such that tab 30 moves at least partially through tab aperture 64). Such deformation may continue until such a point that side arms 36 fully clear tab aperture 64, at which point tab 30 may, as described above, return at least partially toward the rest position thereof, with release arm 34 extending into cutout 68. This process may be repeated with respect to any additional spring clips 10 assembled with housing 52, such that all spring clips 10 are secured in place in a similar manner with respect to their respective tab apertures 64. As described above, such assembly may result in an equilibrium force against housing 52 urging housing 52 towards glass 44 so as to maintain consistent contact therebetween. The process described herein with respect to FIGS. 8 and 9 may, accordingly, be repeated with respect to the desired number of spring clips 10 with additional burner units 46 desired to be assembled with cooktop 42.

The above-described force applied by spring clip 10 on housing 52 to retain housing 52 in contact with glass 44 may be influenced by a spring constant provided by the structure of spring clip 10, in particular of body 12 and support arm spring loop 32. The spring constant thereof may be dictated by the geometry of such structures and by the material properties of spring clip 10. As discussed above, spring clip 10 may be made of a generally unitary piece of metal, such as spring steel or the like. In such an example, the thickness of the material used to form spring clip 10 may be used to provide a desired spring constant. In one example, spring clip 10 may have a material thickness of between about 0.3 mm and 0.6 mm. Such thickness may provide the desired retention force of housing 52 against glass 44, while allowing for assembly of spring clip 10 with both housing 52 and support structure 48 without requiring excessive force to be applied to spring clip 10.

Figure 10:
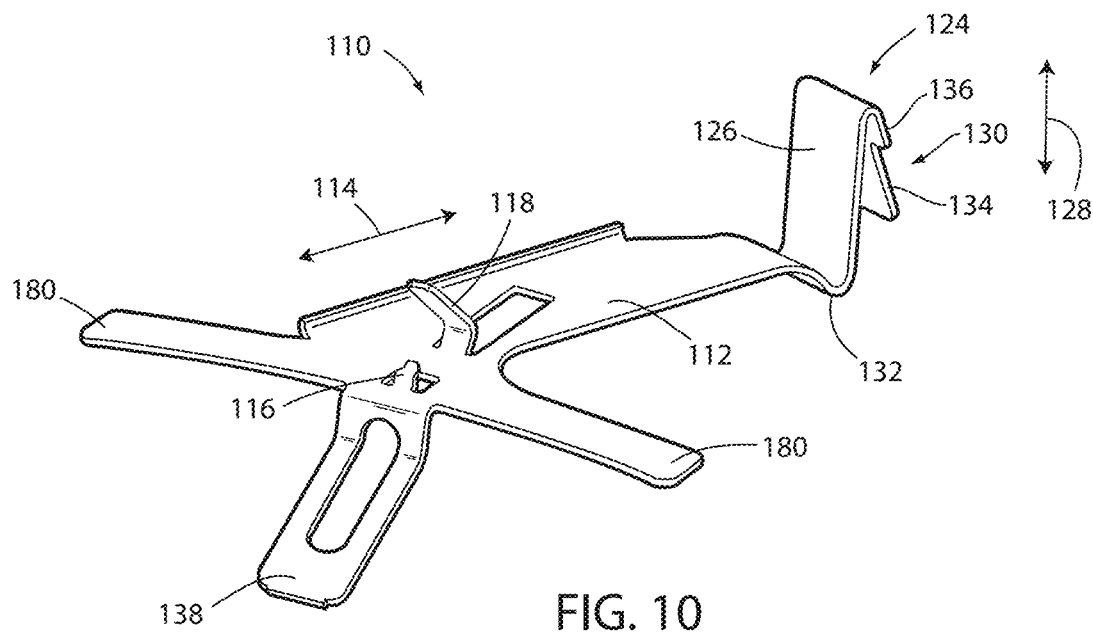
FIG. 10 is a front-perspective view of a variation of a spring clip.
Figure 11:
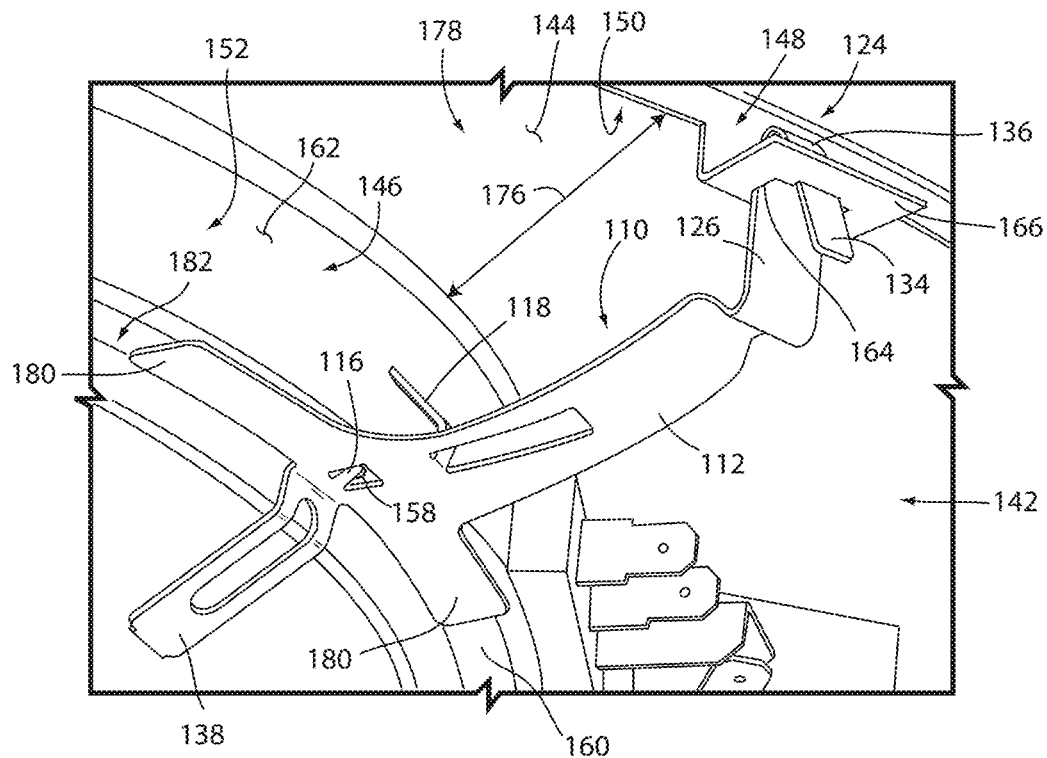
FIG. 11 is a bottom perspective detail view of the spring clip of FIG. 10 coupled between a burner unit and the support structure according to a variation of the burner unit and support structure shown in FIGS. 4 and 5.

FIGS. 10 and 11 show a further embodiment of a spring clip 110 that may be used in a manner similar to that described above to assemble a burner unit 146 with a cooktop 142. Cooktop 142 may be in a similar arrangement that described above with respect to FIGS. 3-5, including the incorporation of support structure 148 having one or more burner apertures 150 therein for receiving a burner unit 146 including a housing 152. The variation of spring clip 110 shown in FIG. 10 includes a body 112 extending in a lateral direction 114 and having a retention tab 116 extending thereof including a portion thereof extending in lateral direction 114. A retention arm 118 extends from body 112 and may be outwardly deflectable with respect to retention tab 116. Such structure allows assembly with a housing 152 including a hole 158 along a bottom wall 160 thereof, as depicted in FIG. 11, with retention tab 16 retained within hole 158 by force of retention arm 118 against a side wall 162 of housing 152.

As shown in FIG. 10, spring clip 110 further includes a snap tab 124 having a support arm 126 extending in vertical direction 128 away from body 112 and supporting a tab 130 thereof. Support arm 126 may be coupled with body 112 by a corresponding spring loop 132 to facilitate movement of tab 130, for example, with respect to body 112. As shown in FIG. 11, spring clip 110 can be assembled with a tab aperture 164 in a receiving tab 166 of support structure 148 that is positioned adjacent to burner aperture 150. Such assembly may be generally similar to that which is described above with respect to FIGS. 6 and 7, including engagement of side arms 136 with portions of receiving tab 166 adjacent tab aperture 164 with a corresponding release arm 134 extending through a cutout 168 in tab aperture 164. As illustrated, body 112 of spring clip 110 may be generally elongated in the lateral direction 114 in comparison to the embodiment depicted in FIG. 1, such that snap tab 124 is positioned at a greater distance 176 than in the embodiment depicted in FIG. 1. This arrangement may allow snap clip 110 to couple a burner unit 146 within a burner aperture 150 in support structure 148, wherein burner unit 146 is generally undersized with respect to aperture 150. Such coupling is achieved by body 112 extending across a gap 178 between aperture 150 and the related burner unit 146.

To allow spring clip 110 to be stably assembled between burner unit 146 and support structure 148, spring clip 110 may further include a plurality of stability flanges 180 extending on opposite sides of body 112 so as to extend along a ridge 182 present in bottom wall 160 of housing 152. Such stability flanges 180 may, thusly prevent rotation of spring clip 110 with respect to housing 152 in a plane generally parallel with bottom wall 160, both during assembly of spring clip 110 with support structure 148 and during use or transportation of the related appliance subsequent to such assembly. It is noted that various combinations of spring clips 10 and spring clips 110 can be used in assembling different ones of burner units 46 or 146 with a single support structure, such as support structure 148 or support structure 48 as needed depending on the configuration of the support structure 148 and the desired sizes of various ones of the burner units 46 or 146 desired to be assembled therewith.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A spring clip for a cooktop, comprising:
   a body;
   a retention tab extending from the body in a first direction, the retention tab being coupled with the body and having a portion extending generally parallel therewith;
   a retention arm projecting away from the retention tab in a second direction generally normal to the first direction; and
   a snap tab extending outwardly from the retention arm and including a support arm connected with the retention arm, a release arm, and at least one side arm.

2. The spring clip of claim 1, wherein the retention arm defines a lever projecting away from the retention tab in the second direction.

3. The spring clip of claim 1, wherein:
   a first portion of the snap tab extends away from the retention arm in the second direction; and
   a second portion of the snap tab is resiliently deflectable toward and away from the retention tab.

4. The spring clip of claim 2, wherein the retention arm defines a resiliently deformable section that facilitates movement of the lever toward and away from the retention tab.

5. The spring clip of claim 1, wherein the body defines a spring loop from which a support arm extends to support the snap tab.

6. The spring clip of claim 5, wherein the snap tab includes a release arm resiliently deflectable toward and away from the support arm.

7. A cooktop, comprising:
   a support structure defining a burner unit aperture and a retention aperture adjacent to the burner unit aperture;
   a burner housing having a side wall and a lower surface defining a hole therein and adjacent to the side wall; and
   a spring clip, including:
      a body
      a retention tab coupled with the body and having a portion extending generally parallel with the body and through the hole and in a first direction within the housing;
      a retention arm projecting away from the retention tab and having an end operably engaged with the side wall of the housing; and
      a snap tab extending outwardly from the retention arm and including a support arm connected with the retention arm, at least one side arm engaged with the retention aperture, and a release arm extending away from the at least one support arm.

8. The cooktop of claim 7, wherein the side arms engage with a flange defined within a portion of the retention aperture.

9. The cooktop of claim 8, wherein:
   the retention aperture of the support structure further defines a cutout; and
   a retention arm of the snap tab extends through the cutout and engages the support structure.

10. The cooktop of claim 7, wherein the retention arm defines a lever, the retention arm being operably engaged with the side wall of the housing along a portion of the lever.

11. The cooktop of claim 10, wherein the spring clip further includes a body, from which the retention tab extends, and a spring loop between the lever and the body, the spring loop exerting a biasing force between the lever and the retention tab.

12. The cooktop of claim 7, wherein the spring clip further includes a body extension portion extending in a lateral direction relative to the lower surface of the housing and operably coupled to the lower surface.

13. The cooktop of claim 7, wherein the retention arm is operably engaged with the side wall of the housing under a biasing force acting opposite the first direction.

14. The cooktop of claim 7, wherein the retention tab at least partially extends toward the side wall of the housing in the first direction.

15. A spring clip for a cooktop, comprising:
   a retention tab extending in a first direction;
   a retention arm defining a lever projecting away from the retention tab; and
   a snap tab having:
      a first portion extending away from the retention arm in a second direction; and
      a second portion resiliently deflectable toward and away from the first portion and the retention tab, the second portion including at least one side arm.

16. The spring clip of claim 15, wherein the retention arm defines a resiliently deformable section that facilitates movement of the second portion toward and away from the retention tab.

17. The spring clip of claim 15, wherein the spring clip further includes a support arm from which the snap tab extends, the snap tab being further resiliently flexible toward and away from the support arm.

18. The spring clip of claim 17, wherein the spring clip further includes a first spring loop and a second spring loop that bias the lever and the support arm, respectively, toward and away from the retention tab.

19. The spring clip of claim 17, wherein the second portion of the snap tab is a release arm that is resiliently deflectable toward and away from the support arm.

* * * * *